United States Patent
Yamaoka (10) Patent No.: US 9,754,129 B2
(45) Date of Patent: Sep. 5, 2017

(54) DATA SECURING DEVICE, RECORDING MEDIUM, AND DATA SECURING METHOD

(71) Applicant: FUJITSU LIMITED, Kawasaki-shi, Kanagawa (JP)

(72) Inventor: Yuji Yamaoka, Kawasaki (JP)

(73) Assignee: FUJITSU LIMITED, Kawasaki (JP)

(*) Notice: Subject to any disclaimer, the term of this patent is extended or adjusted under 35 U.S.C. 154(b) by 57 days.

(21) Appl. No.: 14/963,469

(22) Filed: Dec. 9, 2015

(65) Prior Publication Data
US 2016/0196453 A1   Jul. 7, 2016

(30) Foreign Application Priority Data
Jan. 5, 2015 (JP) .................... 2015-000556

(51) Int. Cl.
*H04L 29/00* (2006.01)
*G06F 21/62* (2013.01)

(52) U.S. Cl.
CPC ...... *G06F 21/6254* (2013.01); *G06F 21/6245* (2013.01)

(58) Field of Classification Search
CPC ............... G06F 7/00; G06F 17/30; G06F 7/04
USPC .......................................................... 726/26
See application file for complete search history.

(56) References Cited

U.S. PATENT DOCUMENTS

| | | | |
|---|---|---|---|
| 7,269,578 B2 | 9/2007 | Sweeney | |
| 8,407,246 B2* | 3/2013 | Bezzi | G06F 17/30386 707/781 |
| 8,627,483 B2* | 1/2014 | Rachlin | G06F 21/6254 705/50 |
| 2015/0007249 A1 | 1/2015 | Bezzi et al. | |

FOREIGN PATENT DOCUMENTS

| | | |
|---|---|---|
| JP | 2008-033411 | 2/2008 |
| JP | 2011-034264 | 2/2011 |
| JP | 2011-100116 | 5/2011 |

OTHER PUBLICATIONS

Extended European Search Report dated Jan. 8, 2016 for corresponding European Patent Application No. 15194522.7, 7 pages.
Ashwin Machanavajjhala et al., "L-Diversity: Privacy Beyond k-Anonymity", ACM Transactions on Knowledge Discovery from Data, vol. 1, No. 1, Article 3, Publication date: Mar. 2007 (52 pages).
Mehmet Ercan Nergiz et al., "δ-Presence without Complete World Knowledge", IEEE Transactions on Knowledge and Data Engineering, vol. 22, No. 6, Jun. 2010 (16 pages).

* cited by examiner

*Primary Examiner* — Brandon Hoffman
*Assistant Examiner* — Michael D Anderson
(74) *Attorney, Agent, or Firm* — Fujitsu Patent Center (57) ABSTRACT

A data securing device according to an embodiment includes a processor that executes a process including: receiving individual data and a parameter for anonymization, using the parameter to suppress data that does not satisfy k-anonymity among data that is included in various attributes of records in the individual data, and suppressing data that is extracted from the data at random; and outputting individual data in which data is suppressed at the receiving.

6 Claims, 9 Drawing Sheets

| ID | ADDRESS | HOBBY | DISEASE |
|---|---|---|---|
| P1 | CITY A | SOCCER | GASTROENTERITIS |
| P2 | CITY A | SOCCER | GASTROENTERITIS |
| P3 | CITY A | SOCCER | COLD |
| P4 | CITY B | PETANQUE | PROGERIA |
| P5 | CITY C | PETANQUE | ALLOTRIOPHAGY |
| P6 | CITY D | SOCCER | COLD |
| P7 | CITY D | SOCCER | COLD |

FIG.3

| BEFORE CONVERSION | AFTER CONVERSION | NUMBER |
|---|---|---|
| {ADDRESS: CITY A, HOBBY: SOCCER, DISEASE: COLD} | {ADDRESS: *, HOBBY: SOCCER, DISEASE: COLD} | 1 |
| {ADDRESS: CITY D, HOBBY: SOCCER, DISEASE: COLD} | {ADDRESS: *, HOBBY: SOCCER, DISEASE: COLD} | 1 |
| {ADDRESS: CITY B, HOBBY: PETANQUE, DISEASE: PROGERIA} | {ADDRESS: *, HOBBY: PETANQUE, DISEASE: *} | 1 |
| {ADDRESS: CITY C, HOBBY: PETANQUE, DISEASE: ALLOTRIOPHAGY} | {ADDRESS: *, HOBBY: PETANQUE, DISEASE: *} | 1 |
| {ADDRESS: CITY D, HOBBY: SOCCER, DISEASE: COLD} | {ADDRESS: *, HOBBY: *, DISEASE: *} | 1 |

FIG.4

| ADDRESS | HOBBY | DISEASE |
|---|---|---|
| CITY A | SOCCER | GASTROENTERITIS |
| CITY A | SOCCER | GASTROENTERITIS |
| * | SOCCER | COLD |
| * | PETANQUE | * |
| * | PETANQUE | * |
| * | SOCCER | COLD |
| * | * | * |

| ADDRESS | HOBBY | DISEASE |
|---------|-------|---------|
| CITY A | SOCCER | GASTROENTERITIS |
| CITY A | SOCCER | GASTROENTERITIS |
| CITY A | SOCCER | COLD |

FIG.9

| ADDRESS | HOBBY | DISEASE |
|---------|-------|---------|
| CITY A | SOCCER | GASTROENTERITIS |
| CITY A | SOCCER | GASTROENTERITIS |

FIG.10

| ADDRESS | HOBBY | DISEASE |
|---------|-------|---------|
| CITY A | SOCCER | COLD |
| CITY B | PETANQUE | PROGERIA |
| CITY C | PETANQUE | ALLOTRIOPHAGY |
| CITY D | SOCCER | COLD |

FIG.11

| ADDRESS | HOBBY | DISEASE |
|---------|-------|---------|
| CITY B | PETANQUE | PROGERIA |
| CITY C | PETANQUE | ALLOTRIOPHAGY |

FIG.12

| BEFORE CONVERSION | AFTER CONVERSION | NUMBER |
|-------------------|------------------|--------|
| {ADDRESS: CITY B, HOBBY: PETANQUE, DISEASE: PROGERIA} | {ADDRESS: *, HOBBY: PETANQUE, DISEASE: *} | 1 |
| {ADDRESS: CITY C, HOBBY: PETANQUE, DISEASE: ALLOTRIOPHAGY} | {ADDRESS: *, HOBBY: PETANQUE, DISEASE: *} | 1 |

FIG.13

| BEFORE CONVERSION | AFTER CONVERSION | NUMBER |
|-------------------|------------------|--------|
| {ADDRESS: CITY A, HOBBY: SOCCER, DISEASE: COLD} | {ADDRESS: *, HOBBY: SOCCER, DISEASE: COLD} | 1 |
| {ADDRESS: CITY D, HOBBY: SOCCER, DISEASE: COLD} | {ADDRESS: *, HOBBY: SOCCER, DISEASE: COLD} | 1 |
| {ADDRESS: CITY B, HOBBY: PETANQUE, DISEASE: PROGERIA} | {ADDRESS: *, HOBBY: PETANQUE, DISEASE: *} | 1 |
| {ADDRESS: CITY C, HOBBY: PETANQUE, DISEASE: ALLOTRIOPHAGY} | {ADDRESS: *, HOBBY: PETANQUE, DISEASE: *} | 1 |

| ADDRESS | HOBBY | DISEASE |
|---------|-------|---------|
| CITY A | SOCCER | GASTROENTERITIS |
| CITY A | SOCCER | GASTROENTERITIS |
| CITY A | SOCCER | COLD |
| CITY B | PETANQUE | PROGERIA |
| CITY C | PETANQUE | ALLOTRIOPHAGY |
| CITY D | SOCCER | COLD |
| CITY D | SOCCER | COLD |

FIG.16

| ADDRESS | HOBBY | GROUP | DISEASE |
|---|---|---|---|
| GOVERNMENT-DESIGNATED CITY | SOCCER | 1 | GASTROENTERITIS |
| GOVERNMENT-DESIGNATED CITY | SOCCER | 1 | GASTROENTERITIS |
| GOVERNMENT-DESIGNATED CITY | SOCCER | 1 | COLD |
| NON-GOVERNMENT-DESIGNATED CITY | PETANQUE | 2 | PROGERIA |
| NON-GOVERNMENT-DESIGNATED CITY | PETANQUE | 2 | ALLOTRIOPHAGY |
| GOVERNMENT-DESIGNATED CITY | SOCCER | 1 | COLD |
| GOVERNMENT-DESIGNATED CITY | SOCCER | 1 | COLD |

DATA SECURING DEVICE, RECORDING MEDIUM, AND DATA SECURING METHOD

CROSS-REFERENCE TO RELATED APPLICATION(S)

This application is based upon and claims the benefit of priority of the prior Japanese Patent Application No. 2015-000556, filed on Jan. 5, 2015, the entire contents of which are incorporated herein by reference.

FIELD

The embodiment discussed herein is directed to a data securing device, a recording medium, and a data securing method.

BACKGROUND

Individual data such as a table that stores the individual's information in each row (record) is converted so as to remain a lot of information while consideration is given to protection of the individual's privacy, whereby it may sometimes be secondarily used for market analysis, or the like. One of the techniques for privacy protection during conversion of the individual data is k-anonymization that achieves information anonymization.

Patent Literature 1: Japanese Laid-open Patent Publication No. 2008-33411.

Patent Literature 2: U.S. Pat. No. 7,269,578.

Non-patent Literature 1: Ashwin Machanavajjhala, Daniel Kifer, Johannes Gehrke, and Muthuramakrishnan Venkitasubramaniam. L-diversity: Privacy beyond k-anonymity. ACM Trans. Knowl. Discov. Data, Vol. 1, March 2007.

However, the above-described conventional technology has a problem in that consideration is not given to protection of the presence so as not to determine whether specific person's information is included and therefore the privacy protection is insufficient.

For example, an explanation is given of a case where a company X collects individual data from customers, sells the collected individual data to a company Y, and the company Y uses the information that is obtained by analyzing the individual data for market analysis, or the like.

For example, the individual data includes personal information, such as an address, hobby, or disease, as well as the identification data (ID) for identifying a customer.

When the company X sells the collected individual data to the company Y, the company X takes into account customers and would rather not provide a different company, such as the company Y, with data that would infringe the customer's privacy. Meanwhile, the company Y does not need the information on individual customers of the company X but would like to acquire the statistical information as accurately as possible.

One of the conversion methods that satisfy the above needs is the statistics on an attribute basis. For example, the method converts the attribute of "hobby" in the individual data into the information of a frequency distribution, such as hobby={soccer: 5, petanque: 2}. The company Y may understand the overall trend of hobbies although it does not know who has which hobby by referring to the information of the frequency distribution.

However, the statistics on an attribute basis do not provide the relationship between attributes. For example, in a case where the company Y would like to analyze the correlation between "address" and "hobby", even if it acquires the statistical data on "address" and "hobby" separately, the difficulty arises in analyzing the correlation between attributes. Therefore, the company X conducts conversion that makes it possible to analyze the relationship between attributes.

Figure 15:
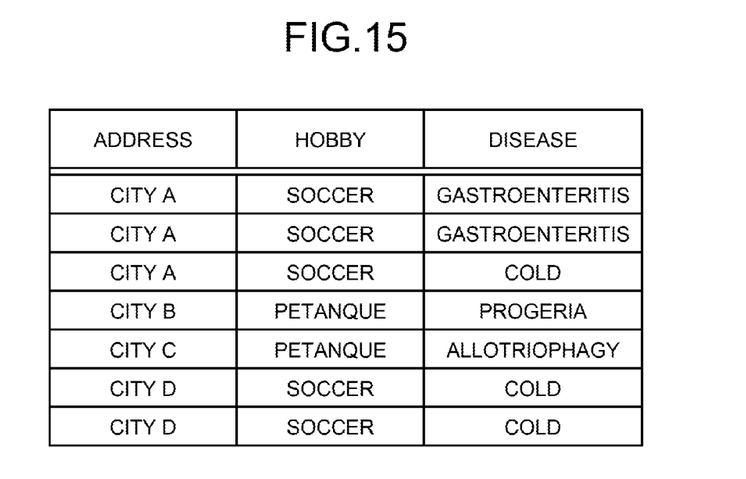
FIG. 15 is an explanatory diagram that illustrates removal of personal identification.

One of the conversion methods that allows analysis of the relationship between attributes is removing personal identification. FIG. 15 is an explanatory diagram that illustrates removal of personal identification, and it is an example of removing personal identification from individual data. As illustrated in FIG. 15, during removal of personal identification, the attribute ("ID" in the illustrated example) such as the identifier in a row that is included in the individual data is deleted. The company Y may analyze the relationship between attributes by using the individual data from which personal identification has been removed.

However, in terms of privacy protection, only removal of personal identification is sometimes insufficient. For example, the following situation is considered.

The person with ID=P4 does not want other people (the company Y) to know his/her disease.

The company Y knows the person with ID=P4 and knows that only that person likes "petanque" in a city B.

If the above situation is given, the removal of personal identification illustrated in FIG. 15 does not provide sufficient privacy protection. This is because the company Y may identify the fourth row (the only row of (address, hobby)= (city B, petanque)) as the data on the person with ID=P4, and it may determine that "disease" of that person is "progeria". However, the information that may be obtained by the company Y is the information that the person with ID=P4 does not want to be known. Therefore, the company X conducts conversion based on the assumption that the company Y has the detailed information about people of less than k (>1).

As described above, one of the conversion methods that allow analysis of the relationship between attributes on the basis of the assumption that there is the detailed information on people of less than k(>1) is k-anonymization for achieving l-diversity (hereinafter, k-anonymization).

With the k-anonymization, quasi-identifier (QI), sensitive-attribute (SA), or the like, is received as an input, and the rows with a similar QI value are grouped (converted into the same value, for example) so that the SA value in each group has diversity. SA is a column of data that the individual (row-information provider) does not want it to be known without any good reason, and QI is a set of columns (1 or more columns) of data that may be easily known to the others. Diversity is the property that may determine the frequency distribution of SA values, for example, the property that may determine that the frequency distribution is slightly biased.

Figure 16:
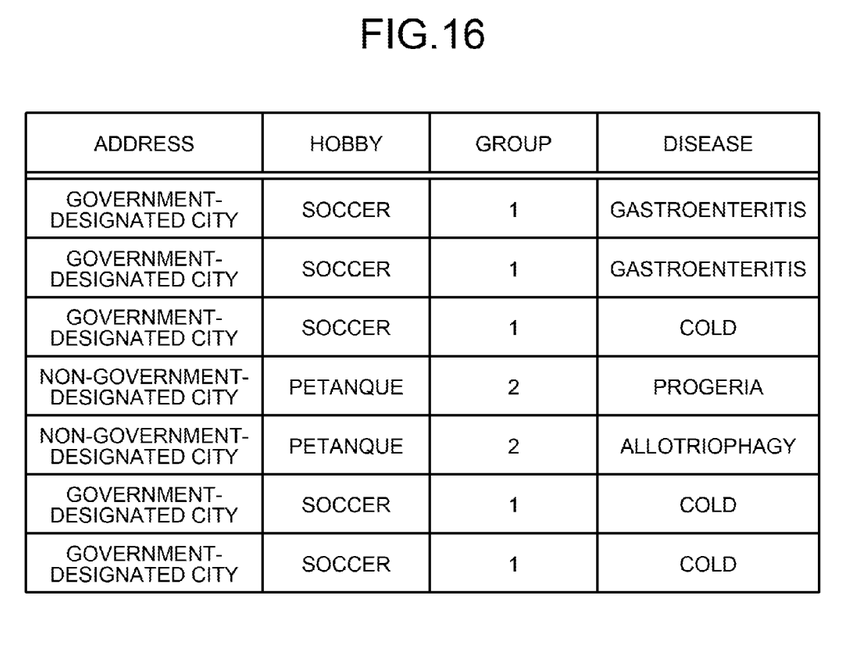
FIG. 16 is an explanatory diagram that illustrates k-anonymization.

FIG. 16 is an explanatory diagram that illustrates k-anonymization. Specifically, in the example of FIG. 16, anonymization is conducted on the individual data that is illustrated in FIG. 15 such that QI={address, hobby}, SA=disease, and diversity "there are two or more types of values", k=2. As illustrated in FIG. 16, "address" is generalized so that it is divided into two groups with the same QI in a horizontal direction. Furthermore, the SA values in both groups satisfy diversity. That is, the frequency distribution of the SA value in any group has two or more types of values.

Therefore, in the example of the k-anonymization, the relationship between attributes may be analyzed, while consideration is given to privacy protection. For example, although the company Y receives the k-anonymized individual data, it is difficult to specify the row of the person with ID=P4, either one of {4, 5} rows; therefore, it is difficult to specify the disease, either one of {progeria, allotriophagy}. As described above, k-anonymization is a conversion method that allows analysis of the relationship between attributes as well as consideration on the privacy protection.

However, as k-anonymization uses an algorithm that does not consider protection of the presence, the privacy protection is insufficient in some cases. Here, the protection of the presence means that it is difficult to determine whether specific person's information (row) is included in the table. For example, if the company Y knows a person who lives in a government-designated city and who likes petanque, it may determine that the person is not included in the example of FIG. 16. Thus, in the example of FIG. 16, protection of the presence is not provided.

For example, if the table of FIG. 16 has the data on "the resident who receives medical care and makes equal to or less than 5 million yen a year", and if it is determined that the person who may be known by the company Y is not included in the table, it may be determined that the person makes much money that is more than 5 million yen a year. Therefore, if the presence is not protected, it can be said that the privacy protection is insufficient.

SUMMARY

According to an aspect of an embodiment, a data securing device includes a processor that executes a process including: receiving individual data and a parameter for anonymization, using the parameter to suppress data that does not satisfy k-anonymity among data that is included in various attributes of records in the individual data, and suppressing data that is extracted from the data at random; outputting individual data in which data is suppressed at the receiving.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

DESCRIPTION OF EMBODIMENT

Preferred embodiments of the present invention will be explained with reference to accompanying drawings. The same reference numeral is applied to the components that have the same functionality according to an embodiment, and duplicated explanations are omitted. Furthermore, the data securing device, the data securing program, and the data securing method that are explained in the following embodiments are only examples, and they are not limitations on the embodiments. Moreover, the following embodiments may be combined as appropriate to the degree such that there is no contradiction.

Figure 1:
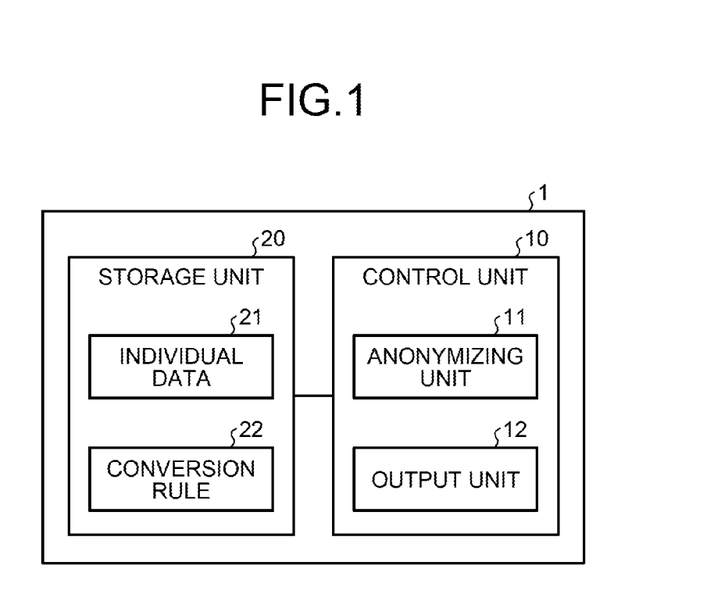
FIG. 1 is a block diagram that illustrates a configuration of a data securing device according to an embodiment.

FIG. 1 is a block diagram that illustrates a configuration of a data securing device 1 according to an embodiment. As illustrated in FIG. 1, the data securing device 1 is an information processing apparatus, such as a personal computer (PC), and it includes a control unit 10 and a storage unit 20.

The control unit 10 includes an internal memory that stores programs that define various procedures, or the like, and needed data, and it performs various operations by using them. The control unit 10 includes an anonymizing unit 11 and an output unit 12.

The anonymizing unit 11 receives individual data 21 and a parameter for anonymization and uses the received parameter to suppress data that does not satisfy k-anonymity among the data that is included in each attribute of a record of the individual data 21. Furthermore, the anonymizing unit 11 suppresses the data that is extracted from the data that is included in each attribute of a record of the individual data 21 irregularly (for example, at random). Specifically, the anonymizing unit 11 generates a conversion rule 22 for suppressing data in the individual data 21 and outputs it.

As described above, the anonymizing unit 11 suppresses the data that does not satisfy k-anonymity among the data that is included in each attribute of a record in the individual data 21 and suppresses the data that is extracted from the data that is included in each attribute of a record in the individual data irregularly (for example, at random). Thus, after data is suppressed by the anonymizing unit 11, the data that is extracted from the individual data 21 at random is suppressed, whereby it is uncertain to estimate whether a specific person is not included, and the presence of the individual may be secured.

The output unit 12 outputs the individual data in which data has been suppressed by the anonymizing unit 11. Specifically, the output unit applies the conversion rule 22, which is generated by the anonymizing unit 11, to the individual data 21 so as to output the individual data in which data has been suppressed. Furthermore, outputs from the output unit 12 may be outputs by using files, or otherwise presentations to a display (not illustrated), communications to different devices that are connected via a communication device (not illustrated), or the like.

The storage unit 20 stores data and programs that are needed for various operations by the control unit 10. For example, the storage unit 20 stores the individual data 21 and the conversion rule 22.

Figure 2:
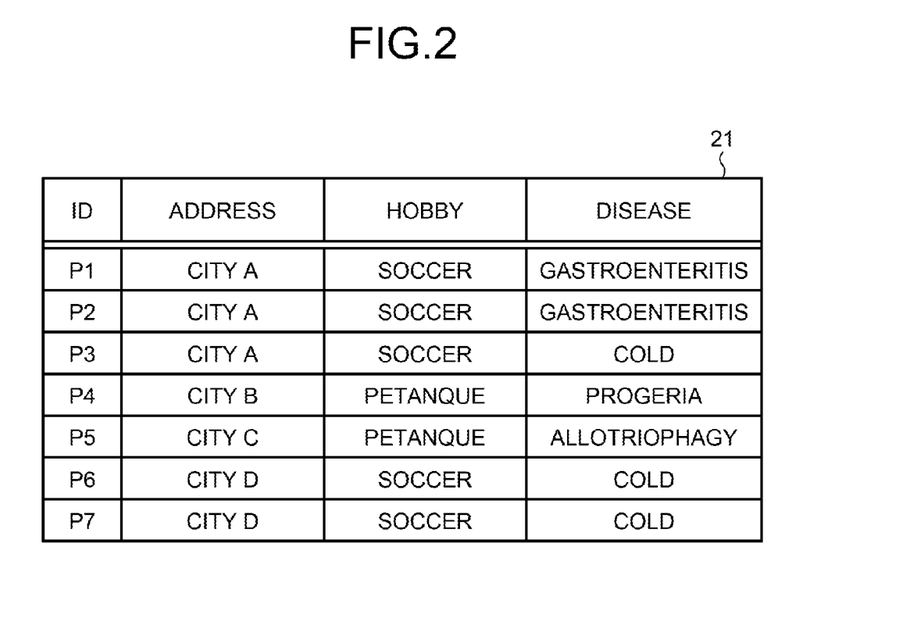
FIG. 2 is an explanatory diagram that illustrates individual data.

The individual data 21 is the table data that stores the individual's information in each row (record). FIG. 2 is an explanatory diagram that illustrates the individual data 21. As illustrated in FIG. 2, each row of the individual data 21 stores the value that indicates an attribute with regard to attributes (columns), such as an address, a hobby, and a disease as well as the ID for identifying a person.

The conversion rule 22 is the information that defines a rule for conversion of the individual data 21. Specifically, the conversion rule 22 (F) is mapping (F:T→$T_F$) from the individual data 21 (T) into different individual data ($T_F$), and it is a collection of rules (f) for converting a row that has a specific value into a different value.

Figure 3:
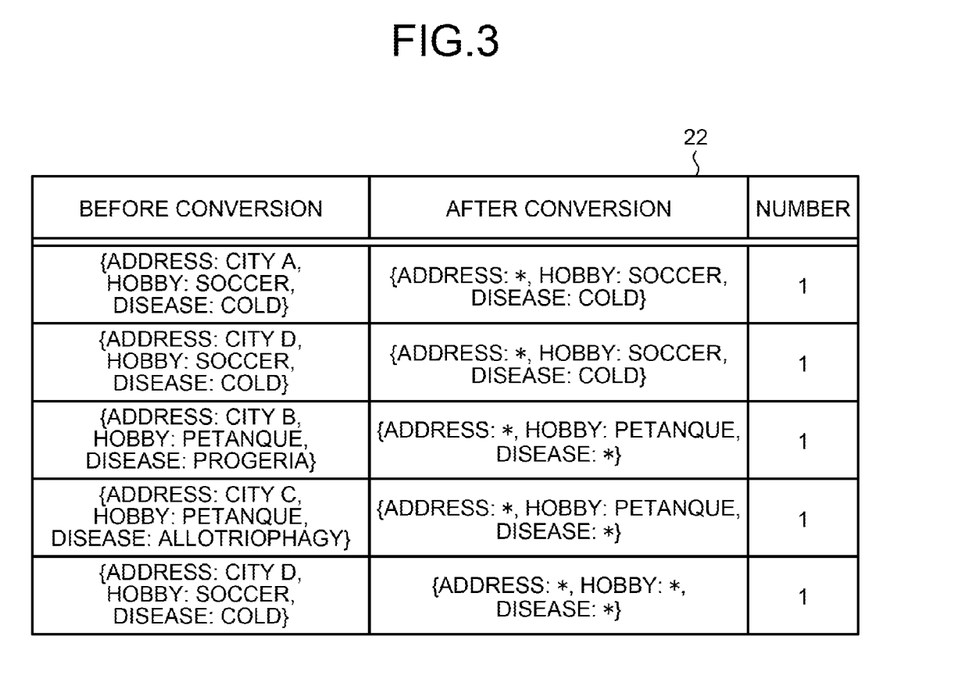
FIG. 3 is an explanatory diagram that illustrates a conversion rule.

FIG. 3 is an explanatory diagram that illustrates the conversion rule 22. As illustrated in FIG. 3, the rule (f) of the conversion rule 22 is described for each row. The rule (f) is represented as, e.g., "pre-conversion value→post-conversion value". For example, it is {address: city A, hobby: soccer, disease: cold}→{address: *, hobby: soccer, disease: cold}, or the like. Here, "*" is the attribute value that means that the value is uncertain. The number of elements in each rule indicates the number of times that the rule is applied. Furthermore, the description of the rule (f) in FIG. 3 is an example, and any description that indicates mapping (F:T→$T_F$) may be used.

During the conversion that uses the conversion rule 22 illustrated in FIG. 3, with respect to each row of the individual data 21 (T), if the conversion rule 22 contains a row that has the same pre-conversion value, the row of the conversion rule 22 is f. Then, with regard to the row that has the same pre-conversion value as f in T, it is converted into the post-conversion value of f, and the number of f is decreased by one. Then, the row is deleted if the number of elements in the conversion rule 22 becomes zero. Furthermore, with respect to each row of the individual data 21 (T), if the conversion rule 22 does not contain the row that has the same pre-conversion value, the row in T is not converted.

Figure 4:
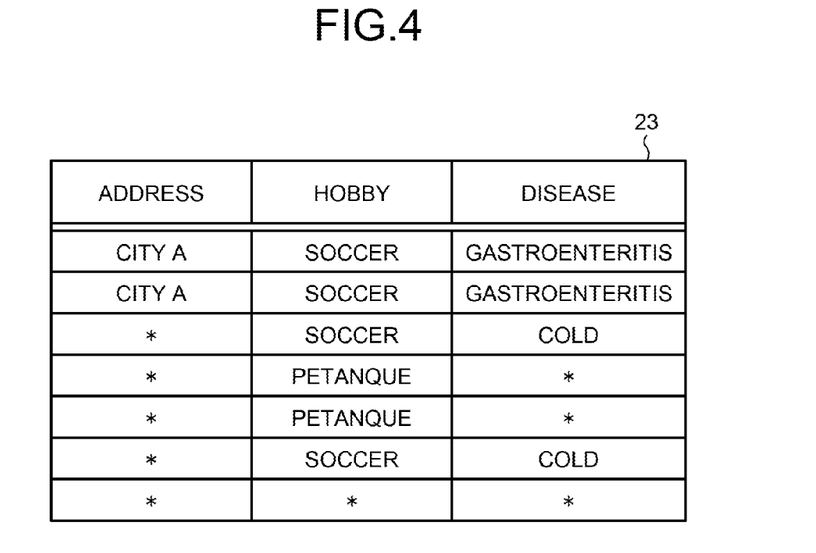
FIG. 4 is an explanatory diagram that illustrates a conversion result.

FIG. 4 is an explanatory diagram that illustrates a conversion result 23. As illustrated in FIG. 4, the conversion result 23 is the result ($T_F$) of the conversion of the individual data 21 (T) that is illustrated in FIG. 2 by using the conversion rule 22 (F) that is illustrated in FIG. 3.

Figure 5:
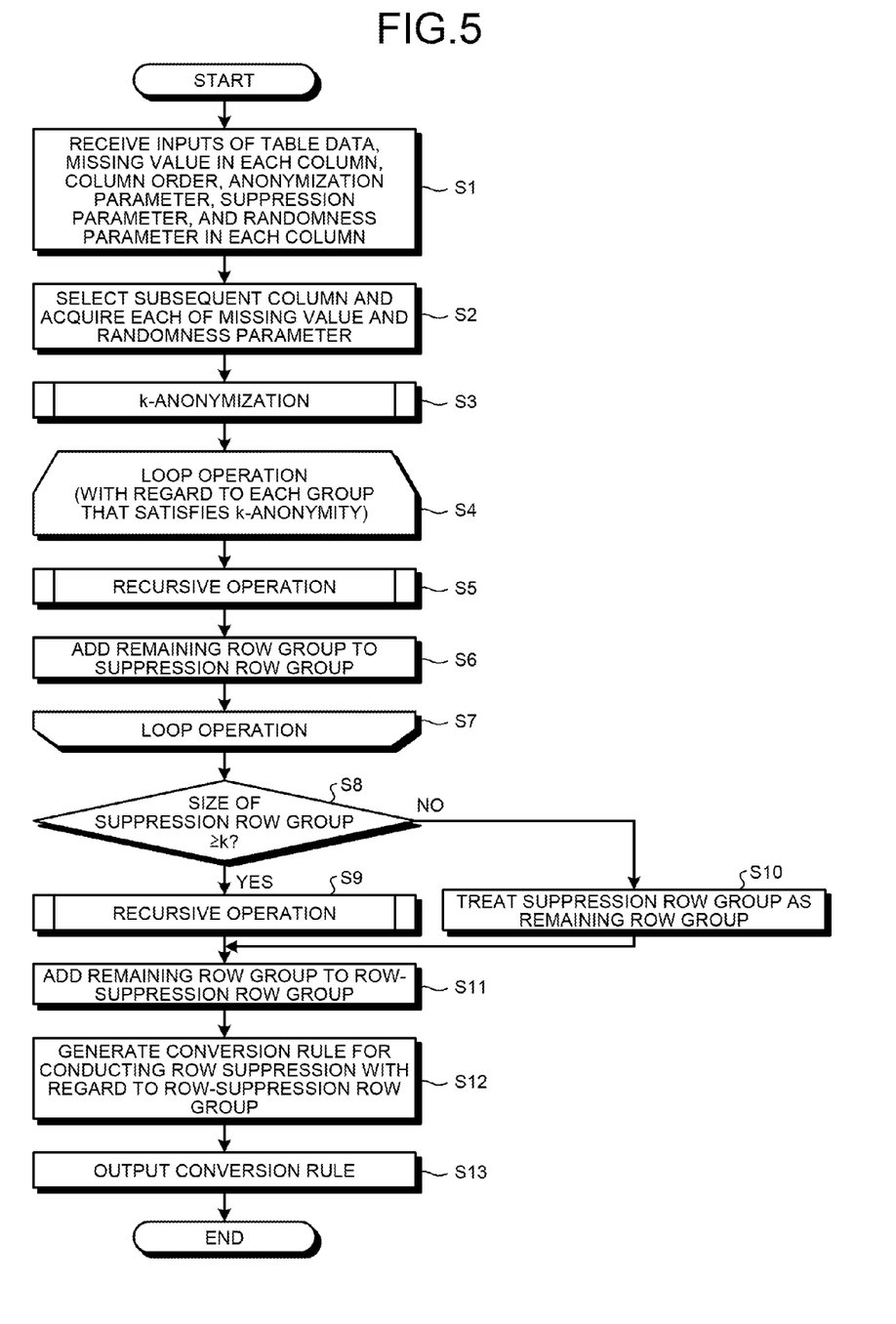
FIG. 5 is a flowchart that illustrates an operation example of a data securing device.

Next, an explanation is given of the details of an anonymization operation by the anonymizing unit 11. FIG. 5 is a flowchart that illustrates an operation example of the data securing device 1.

As illustrated in FIG. 5, after the anonymization operation is started by the anonymizing unit 11, the anonymizing unit 11 receives inputs of the table data that is intended for anonymization, a missing value in each column, column order, anonymization parameter, suppression parameter, and randomness parameter in each column (step S1).

Specifically, the anonymizing unit 11 reads the individual data 21 that is stored in the storage unit 20 and receives it as table data (T) that is intended for anonymization. Furthermore, the anonymizing unit 11 receives inputs of the missing value in each column, the column order, the anonymization parameter, the suppression parameter, and the randomness parameter in each column by reading a parameter that is previously stored in the storage unit 20, an input operation on an input device (e.g., keyboard), or the like.

For a missing value (M) in each column, mapping (M:c→m) is conducted from a column name (attribute name) in the table data (T) into a missing value, for example, M (address)=M (hobby)=M (disease)="*". The missing value is the attribute value "*" that means that the value is uncertain. Generating a certain attribute value as a missing value corresponds to generalizing and suppressing the certain attribute value.

A column order (C) is a list of column names (attribute names) that are arranged in the order they are subjected to an operation and, for example, C={address, hobby, disease}. An anonymization parameter (k) is a parameter for k-anonymization to obtain a state where there is equal to or more than k individuals who have the same attribute and, for example, k=2. A suppression parameter (s) is the number of rows on which suppression is performed and, for example, s=1.

For a randomness parameter (R) in each column, mapping (R:c→r) is conducted from a column name (attribute name) into a randomness parameter and, for example, R (address)=R (hobby)=R (disease)=0.2. A randomness parameter is a parameter in the range (0, 1) for giving the degree of effect of a random number and, as the value becomes larger (approaching 1), the effect of the random number becomes higher.

For instance, in the example of the individual data 21 in FIG. 2, M(c)=* (c is arbitrary), C={address, hobby, disease}, k=2, s=1, and R(c)=0.2.

Next, the anonymizing unit 11 selects the subsequent column (c) in the table data and acquires a missing value (m) and a randomness parameter (r) (step S2). Specifically, it refers to the first element in C={address, hobby, disease}, and c=address. Furthermore, based on the values that are received at step S1, m=M(c)=*, r=R(c)=0.2.

Next, the anonymizing unit 11 performs a k-anonymization operation by using a random number with regard to the column (c) that is selected at step S2 (step S3). The k-anonymization operation is described later in detail. As a result of the k-anonymization operation, the anonymizing unit 11 obtains, with regard to the selected column (c), a row-suppression row group (W) and a suppression row group (X) of a row that does not satisfy k-anonymity and that is to be suppressed and obtains a group (G) that satisfies k-anonymity. Here, the row-suppression row group (W) is the group of rows for which the row itself is suppressed, and the suppression row group (X) is the group of rows for which the value of the selected column (c) is suppressed.

For example, the row-suppression row group W=[T(7)], the suppression row group X=[T(4), T(5), T(6)], and the group G that satisfies k-anonymity={[T(1), T(2), T(3)]} are obtained. Here, T(n) is the data on the n (n≥1) row in the table data T. For instance, in the example of the individual data 21 (T) of FIG. 2, T(1)=T(2)={address: city A, hobby: soccer, disease: gastroenteritis}. Here, if a rule is formed to generate a missing value for the row-suppression row group W and the suppression row group X that are obtained, k-anonymity may be achieved in terms of the column (c) alone. Furthermore, during the k-anonymization operation, the number of elements of W is the value of s; however, there is a possibility that the contents of the others are changed each time the k-anonymization operation is invoked due to the effect of the random number.

Next, the anonymizing unit 11 sequentially fetches an element from the group (G) and performs a loop operation at steps S4 to S7 with regard to each group that satisfies k-anonymity, thereby recursively performing the k-anonymization operation. Specifically, as the group G={[T(1), T(2), T(3)]}, table data (T') on which the k-anonymization operation is recursively performed is T'=[T(1), T(2), T(3)].

Next, the anonymizing unit 11 performs a recursive operation (step S5) on a column (c') that is subsequent to the selected column (c), where a set (D) of columns to be suppressed is null (D={ }). For example, if the elements of a column are C={address, hobby, disease} and if the selected column (c) is c=address, c'=hobby. The recursive operation is described later in detail.

As a result of the recursive operation, the anonymizing unit 11 obtains the remaining row group (E:E=[T(3)]). With the row group of T'-E that is obtained during the recursive operation, it is possible to generate a rule for achieving k-anonymity with regard to C. During the recursive operation, as [T(1), T(2)] is T(1)=T(2), they satisfy k-anonymity of k=2 with regard to C from the beginning; therefore, a conversion rule is not generated. Furthermore, there is a possibility that the invocation result of the recursive operation is changed each time it is invoked due to the effect of the random number.

Next, the anonymizing unit 11 adds the remaining row group (E) to the suppression row group (X) (step S6). For example, the suppression row group X=[T(4), T(5), T(6)] and, if the remaining row group E=[T(3)], X=[T(3), T(4), T(5), T(6)].

After the loop operation (steps S4 to S7), the anonymizing unit 11 determines whether a size of the suppression row group is equal to or more than k (step S8) and, if it is equal to or more than k (step S8: YES), it proceeds to the operation at step S9 and, if it is not equal to or more than k (step S8: NO), it proceeds to the operation at step S10. For example, if X=[T(3), T(4), T(5), T(6)], |X|=4≥k=2; therefore, the anonymizing unit 11 proceeds to the operation at step S9.

At step S9, the anonymizing unit 11 performs a recursive operation on the column (c') that is subsequent to the selected column (c), where the suppression row group is T'. For example, if the elements of the column is C={address, hobby, disease} and if the selected column (c) is c=address, c'=hobby. Then, a recursive operation is performed by using T', c', where T'=X, D={c}={address}.

As a result of the recursive operation, the anonymizing unit 11 obtains the remaining row group (E:E=[ ]). With the row group of T'-E that is obtained during the recursive operation, it is possible to generate a rule for achieving k-anonymity with regard to C.

At step S10, the anonymizing unit 11 treats the suppression row group (X) as the remaining row group (E).

After steps S9 and S10, the anonymizing unit adds the remaining row group (E) to the row-suppression row group (W) (step S11). In the example of the above-described step S9, as the remaining row group E=[ ], W is not changed, and W=[T(7)].

Next, the anonymizing unit 11 generates a conversion rule for conducting row suppression by obtaining each column as a missing value with regard to the row-suppression row group (W) and adds it to the conversion rule 22 (F) (step S12). Next, the anonymizing unit 11 outputs the conversion rule 22 (F) (step S13). That is, the anonymizing unit 11 outputs the conversion rule 22 that is illustrated in FIG. 3.

Figure 6:
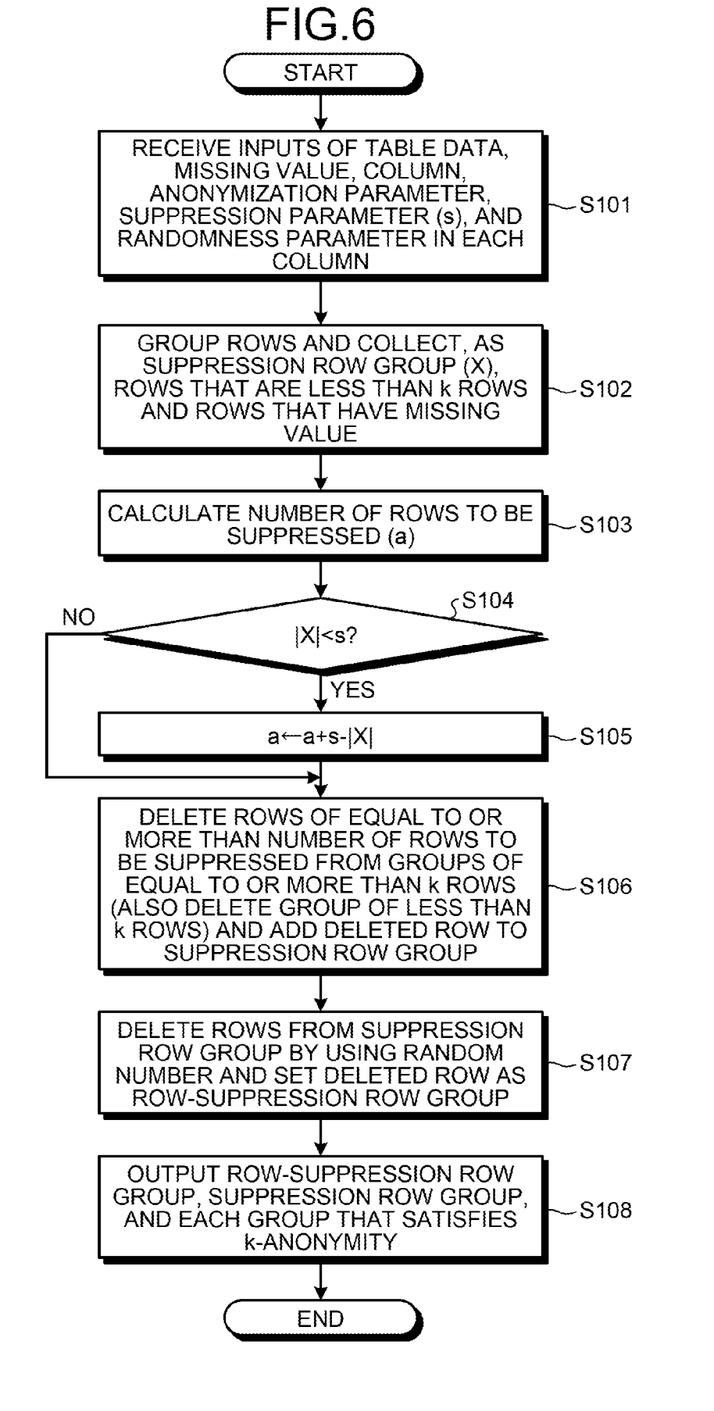
FIG. 6 is a flowchart that illustrates an example of a k-anonymization operation.

Here, the k-anonymization operation is explained in detail. FIG. 6 is a flowchart that illustrates an example of the k-anonymization operation.

As illustrated in FIG. 6, after the k-anonymization operation is started, the anonymizing unit 11 receives inputs of the table data (T) that is intended for anonymization, the missing value (m), the column (c), the anonymization parameter (k), the suppression parameter (s), and the randomness parameter (r) in each column (step S101). For example, during the k-anonymization operation after step S2, the values of m=*, c=address, k=2, s=1, and r=0.2 are received with regard to the column that is selected at step S2.

Next, the anonymizing unit 11 groups the rows with respect to the selected column (element) and collects, as the suppression row group (X) for which the value of the selected column is to be suppressed, the rows that are less than k rows and the rows that have a missing value (step S102). Specifically, in the example of the individual data 21 (T) of FIG. 2, if grouping is conducted by using c=address, {city A: [T(1), T(2), T(3)], city B: [T(4)], city C: [T(5)], city D: [T(6), T(7)]} is obtained. Among them, the rows that are less than k=2 rows are {city B, city C}, and there are no rows in which the value is m=*; thus, X=[T(4), T(5)].

Next, the anonymizing unit 11 calculates a number of rows to be suppressed (a) by using a←ceil (log$_r$u−1) (step S103). Here, ceil is a ceiling function, and u is a uniform random number in the range (0, 1). If the random number u=0.1 is obtained, a=ceil(log$_{0.2}$0.1−1)=1. Furthermore, any method of calculating the number of rows to be suppressed (a) may be used if it is such that the number of rows is larger, the acquisition percentage is lower, and there is no particular limitation.

Next, the anonymizing unit 11 determines whether |X|<s (step S104) and, if |X|<s (step S104: YES), it proceeds to the operation at step S105 and, if not |X|<s (step S104: NO), it proceeds to the operation at step S106. In the example, s=1 and X=[T(4), T(5)]. Therefore, |X|=2≥s=1; thus, the condition at step S104 is not satisfied, and the anonymizing unit 11 proceeds to the operation at step S106.

At step S105, the anonymizing unit 11 determines that the number of rows to be suppressed (a) is a←a+s−|X| and proceeds to the operation at step S106. In the above-described case, for example, if s=3, |X|<s; therefore, the operation proceeds to step S105, and a=2.

At step S106, the anonymizing unit 11 deletes rows of equal to or more than the number of rows to be suppressed from the groups of equal to or more than k rows (also deletes the group of less than k rows), and adds the deleted rows to the suppression row group (X). For example, the groups of equal to or more than k rows are {city A: [T(1), T(2), T(3)], city D: [T(6), T(7)]}, and a=1 row is transferred to X therefrom. Specifically, a value is first selected by using a random number so that the city D is selected. Next, a row of the city D is selected by using a random number so that T(6) is selected. Furthermore, if T(6) is deleted, the city D group has the number of rows of less than k and, as a result, all the rows in the group are transferred to the suppression row group (X). Here, as the rows of equal to or more than a rows are transferred, no more rows are transferred. As a result, X=[T(4), T(5), T(6), T(7)]. Furthermore, the group that satisfies k-anonymity is G={[T(1), T(2), T(3)]} that have the city A as their elements.

Next, the anonymizing unit 11 deletes rows from the suppression row group (X) by using a random number and sets the deleted rows as the row-suppression row group (W) (step S107). Specifically, s=1 row is selected by using a random number so that T(7) is selected from X=[T(4), T(5), T(6), T(7)]. In this case, X=[T(4), T(5), T(6)], and the row-suppression row group W=[T(7)].

Next, the anonymizing unit 11 outputs the row-suppression row group (W), the suppression row group (X), and each group (G) that satisfies k-anonymity that are obtained during the operation at steps S101 to S107 (step S108). Specifically, in the above-described example, W=[T(7)], X=[T(4), T(5), T(6)], and G={[T(1), T(2), T(3)]} are output.

Figure 7:
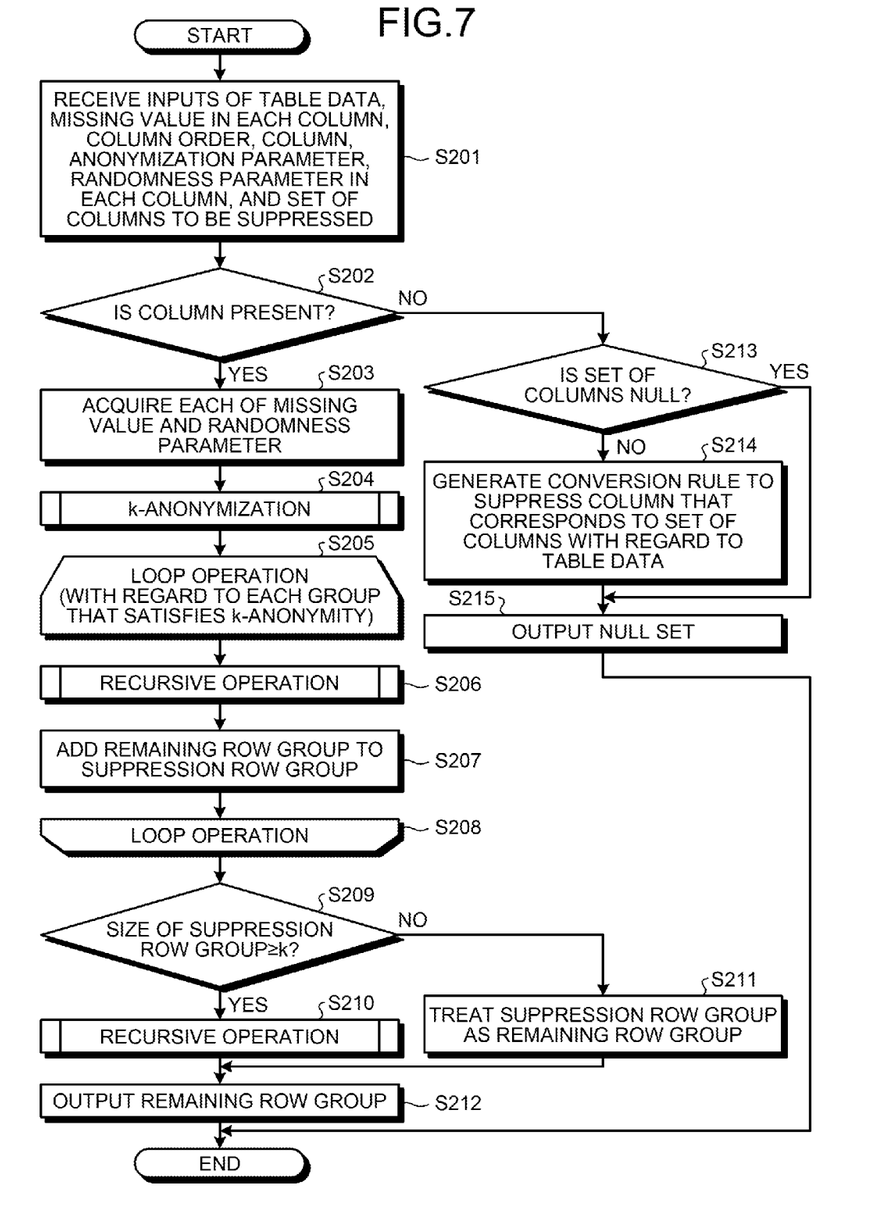
FIG. 7 is a flowchart that illustrates an example of a recursive operation.

Next, the recursive operation is explained in detail. FIG. 7 is a flowchart that illustrates an example of the recursive operation.

As illustrated in FIG. 7, after the recursive operation is started by the anonymizing unit 11, the anonymizing unit 11 receives inputs of the table data that is the subject to be processed, a missing value in each column, the column order, a column, an anonymization parameter, a randomness parameter in each column, and a set (D) of columns to be suppressed (step S201).

Next, the anonymizing unit 11 determine whether the column (c) is present (step S202) and, if it is present (step S202: YES), it proceeds to the operation at step S203 and, if not (step S202: NO), it proceeds to the operation at step S213.

At step S203, the anonymizing unit 11 acquires the missing value (m) and the randomness parameter (r) from the values that are received at step S201.

Next, the anonymizing unit 11 invokes and executes the k-anonymization operation by using s=0 (step S204). Next, with regard to each group that satisfies k-anonymity, the anonymizing unit 11 sequentially fetches an element from the group (G) and performs a loop operation at steps S205 to S208, thereby recursively performing the k-anonymization operation.

During the loop operation, the anonymizing unit 11 performs the recursive operation on the column (c') that is subsequent to the selected column (c) (step S206) and obtains the remaining row group (E). Next, the anonymizing unit 11 adds the remaining row group (E) to the suppression row group (X) (step S207). Then, if the group (G) contains no element, the anonymizing unit 11 terminates the loop operation at steps S205 to S208 and proceeds to the operation at step S209.

At step S209, the anonymizing unit 11 determines whether the suppression parameter is equal to or more than k and, if it is equal to or more than k (step S209: YES), proceeds to the operation at step S210 and, if it is not equal to or more than k (step S209: NO), proceeds to the operation at step S211.

At step S210, the anonymizing unit 11 sets the suppression row group as T' with regard to the column (c') that is subsequent to the selected column (c), adds the selected column (c) to the set (D) of columns to be suppressed so as to set the new set (D) of columns, and performs a recursive operation. As a result of the recursive operation, the anonymizing unit 11 obtains the remaining row group (E) and proceeds to the operation at step S212.

At step S211, the anonymizing unit 11 treats the suppression row group (X) as the remaining row group (E) and proceeds to the operation at step S212. At step S212, the anonymizing unit 11 outputs the remaining row group (E) and terminates the operation.

At step S213, the anonymizing unit 11 determines whether the set (D) of columns is null and, if it is null (step S213: YES), proceeds to the operation at step S215 and, if it is not null (step S213: NO), proceeds to the operation at step S214. At step S214, the anonymizing unit 11 generates a conversion rule for suppressing a column that corresponds to the set (D) of columns with regard to the table data and proceeds to the operation at step S215. At step S215, the anonymizing unit 11 outputs a null set ([ ]) as the remaining row group (E) and terminates the operation.

Here, a more specific explanation is given of the recursive operation by illustrating some pieces of table data.

Figure 8:
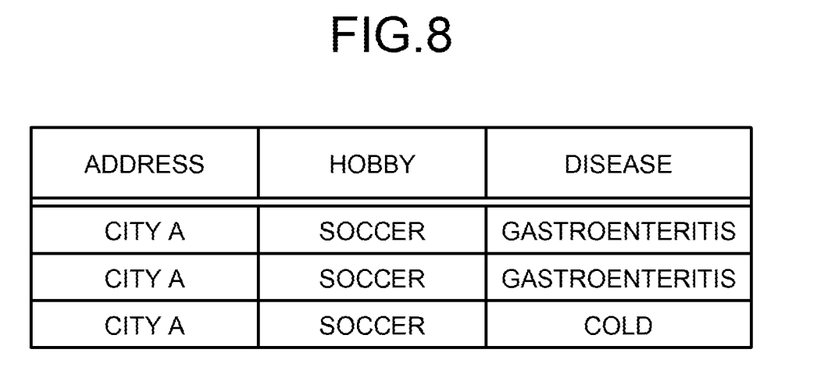
FIG. 8 is an explanatory diagram that illustrates an example of table data.

FIGS. 8 to 11 are explanatory diagrams that illustrate examples of the table data. At step S201, for example, the table data (T') that is illustrated in FIG. 8 is received as the subject to be processed. Furthermore, inputs of M(c)=* (c is arbitrary), C={address, hobby, disease}, c=hobby, k=2, R(c)=0.2 (c is arbitrary), and D={ } are received.

At step S202, as c=hobby, the operation proceeds to step S203. At step S203, the anonymizing unit 11 acquires the missing value (m) and the randomness parameter (r) from the values that are received at step S201. Here, m=M(c)=*, r=R(c)=0.2.

Next, at step S204, the k-anonymization operation is invoked, and the row-suppression row group W=[ ], the suppression row group X=[ ], and the group G={[T(1), T(2), T(3)]} that satisfies k-anonymity are obtained.

Next, during the loop operation at steps S205 to S208, as the group G={[T(1), T(2), T(3)]}, the table data (T') on which the k-anonymization operation is recursively performed is T'=[T(1), T(2), T(3)].

During the recursive operation at step S206, as the elements of the column are C={address, hobby, disease} and c=hobby, c'=disease. As a result of the recursive operation, the anonymizing unit 11 obtains the remaining row group (E:E=[T(3)]). At step S207, as the remaining row group E=[T(3)], X=[T(3)]. Furthermore, as the group (G) contains no subsequent elements, the loop operation at steps S205 to S208 is terminated, and the operation proceeds to step S209.

At step S209, as |X|=[T(3)]=1<k=2, the operation proceeds to step S211. Thus, after steps S211 and S212, [T(3)] is output as the remaining row group.

Next, an explanation is given of a case where, at step S201, the table data (T') that is illustrated in FIG. 8 is received as the subject to be processed and the inputs of M(c)=* (c is arbitrary), C={address, hobby, disease}, c=disease, k=2, R(c)=0.2 (c is arbitrary), and D={ } are received.

In this case, at step S202, as c=disease, the operation proceeds to step S203. At step S203, m=M(c)=*, r=R(c)=0.2 are obtained from the values that are received at step S201.

Next, at step S204, the k-anonymization operation is invoked, and the row-suppression row group W=[ ], the suppression row group X=[T(3)], and the group G={[T(1), T(2)]} that satisfies k-anonymity are obtained.

Next, during the loop operation at steps S205 to S208, as the group G={[T(1), T(2)]}, the table data (T') on which the k-anonymization operation is recursively performed is T'=[T(1), T(2)].

During the recursive operation at step S206, as the elements of the column is C={address, hobby, disease} and c=disease, c'=(not available). As a result of the recursive operation, the anonymizing unit 11 obtains the remaining row group (E:E=[ ]). At step S207, as E=[ ] is added to X=[T(3)], X=[T(3)]. Furthermore, as the group (G) contains no subsequent elements, the loop operation at steps S205 to S208 is terminated, and the operation proceeds to step S209.

At step S209, as |X|=[T(3)]=1<k=2, the operation proceeds to step S211. Thus, after steps S211 and S212, [T(3)] is output as the remaining row group.

Figure 9:
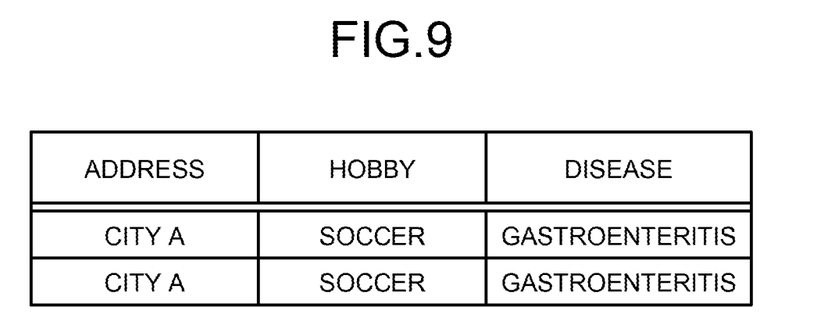
FIG. 9 is an explanatory diagram that illustrates an example of the table data.

Next, an explanation is given of a case where, at step S201, the table data (T') that is illustrated in FIG. 9 is received as the subject to be processed and the inputs of M(c)=* (c is arbitrary), C={address, hobby, disease}, c=(not available), k=2, R(c)=0.2 (c is arbitrary), and D={ } are received.

In this case, at step S202, as c=(not available), the operation proceeds to step S213. At step S213, as D={ }, the operation proceeds to step S215, and a null set ([ ]) is output as the remaining row group (E).

Figure 10:
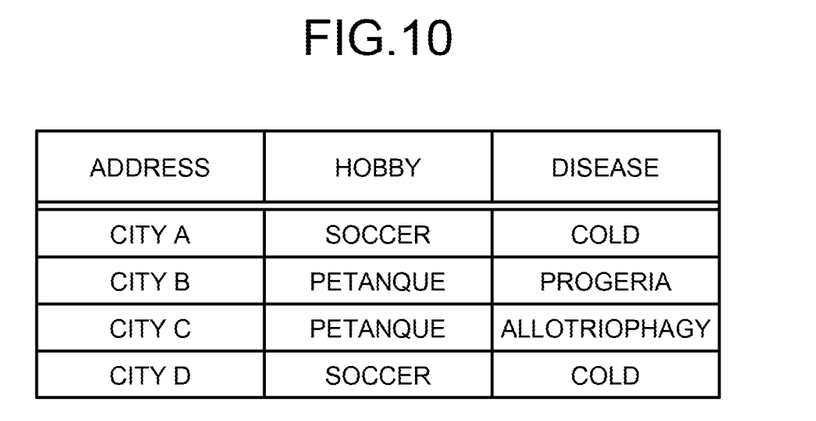
FIG. 10 is an explanatory diagram that illustrates an example of the table data.

Next, an explanation is given of an operation example of a case where D is not null ({ }). Specifically, at step S201, the table data (T') that is illustrated in FIG. 10 is received as the subject to be processed, and the inputs of M(c)=* (c is arbitrary), C={address, hobby, disease}, c=hobby, k=2, R(c)=0.2 (c is arbitrary), and D={address} are received.

In this case, at step S202, as c=hobby, the operation proceeds to step S203. At step S203, by using the values that are received at step S201, m=M(c)=*, r=R(c)=0.2.

Next, at step S204, the k-anonymization operation is invoked by using s=0, and the row-suppression row group W=[ ], the suppression row group X=[ ], and the group G={[T(1), T(4)], [T(2), T(3)]} that satisfy k-anonymity are obtained.

Next, during the loop operation at steps S205 to S208, as the group G={[T(1), T(4)], [T(2), T(3)]}, the table data (T') on which the k-anonymization operation is recursively performed is T'=[T(1), T(4)].

During the recursive operation at step S206, as the elements of the column are C={address, hobby, disease} and c=hobby, c'=disease. As a result of the recursive operation, the anonymizing unit 11 obtains the remaining row group (E:E=[ ]). At step S207, the remaining row group E=[ ], X=[ ]. Furthermore, as the group (G) contains subsequent elements [T(2), T(3)], the operation returns to step S205, and the table data (T') on which the k-anonymization operation is recursively performed is T'=[T(2), T(3)].

During the recursive operation at step S206, c'=disease and, as a result of the recursive operation, the anonymizing unit 11 obtains the remaining row group E:E=[ ]). At step S207, as the remaining row group E=[ ], X=[ ]. Furthermore, the group (G) contains no subsequent elements, the loop operation at steps S205 to S208 is terminated, and the operation proceeds to step S209.

At step S209, as |X|=[ ]=0<k=2, the operation proceeds to step S211. Thus, after steps S211 and S212, [ ] is output as the remaining row group.

Figure 11:
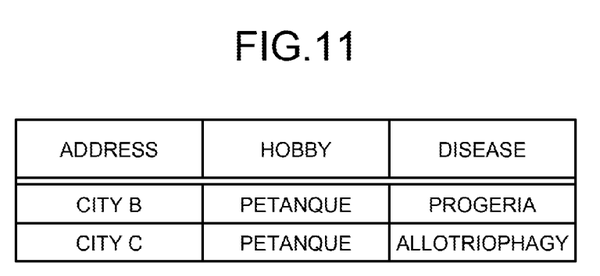
FIG. 11 is an explanatory diagram that illustrates an example of the table data.

Next, an explanation is given of a case where, at step S201, the table data (T') that is illustrated in FIG. 11 is received as the subject to be processed and the inputs of M(c)=* (c is arbitrary), C={address, hobby, disease}, c=disease, k=2, R(c)=0.2 (c is arbitrary), and D={address} are received.

In this case, at step S202, as c=disease, the operation proceeds to step S203. At step S203, by using the values that are received at step S201, m=M(c)=*, r=R(c)=0.2.

Next, at step S204, the k-anonymization operation is invoked by using s=0, and the row-suppression row group W=[ ], the suppression row group X=[T(1), T(2)], and the group G={ } that satisfies k-anonymity are obtained.

During the loop operation at steps S205 to S208, as the group (G) contains no element, the operation is terminated, and the operation proceeds to step S209. At step S209, as |X|=[T(1), T(2)]=2k=2, the operation proceeds to step S210.

At step S210, the element that is subsequent to c=disease is referred to from C, and c'=(not available). Then, T'=X, D'=DU{c}={address, disease}, and the recursive operation is performed by using T', c', D'. As a result of the recursive operation, the anonymizing unit 11 obtains the remaining row group (E:E=[ ]). At step S212, the remaining row group E=[ ] is output.

Next, an explanation is given of a case where, at step S201, the table data (T') that is illustrated in FIG. 11 is received as the subject to be processed and the inputs of M(c)=* (c is arbitrary), C={address, hobby, disease}, c=(not available), k=2, R(c)=0.2 (c is arbitrary), and D={address, disease} are received.

In this case, at step S202, as c=(not available), the operation proceeds to step S213. At step S213, as D={address, disease}, the operation proceeds to step S214. At step S214, a conversion rule is generated to suppress the column that corresponds to D={address, disease}. Suppression means generating the value of the column as a missing value by using M. For example, with regard to T(1), a conversion rule is generated such that {address: city B, hobby: petanque, disease: progeria}→{address:*, hobby: petanque, disease: *}.

Figure 12:
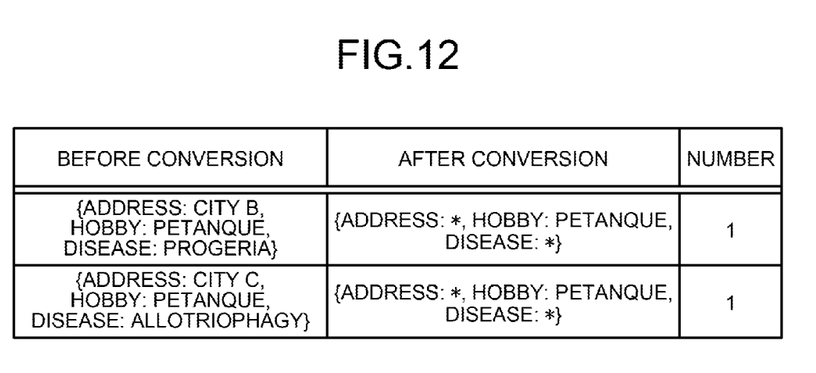
FIG. 12 is an explanatory diagram that illustrates an example of a conversion rule.
Figure 13:
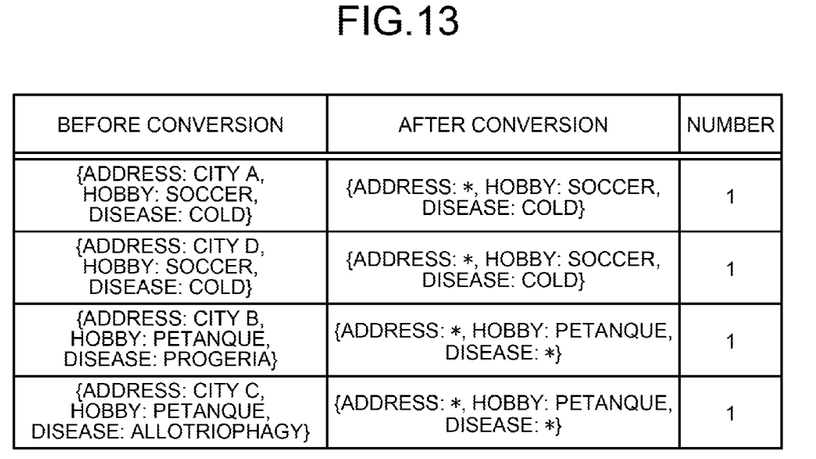
FIG. 13 is an explanatory diagram that illustrates an example of the conversion rule.

FIGS. 12 and 13 are explanatory diagrams that illustrate examples of the conversion rule. In the example of FIG. 11, the conversion rule as in FIG. 12 is generated during the above-described recursive operation. Similarly, in the example of FIG. 10, the conversion rule as in FIG. 13 is generated during the above-described recursive operation.

As described above, the operation (e.g., FIG. 5) on principally the first column is different from the recursive operation (e.g., FIG. 7) on the other columns in that row suppression is conducted on equal to or more than s rows. Specifically, row suppression on s rows is determined at step S3, and row suppression on the rows that do not satisfy k-anonymity in its entirety is determined at step S11. Therefore, as equal to or more than s rows are suppressed, it produces an advantage such that it is uncertain to estimate whether a specific person is not included.

Furthermore, the operations at steps S4 to S7 of FIG. 5 and at steps S205 to S208 of FIG. 7 are to attempt k-anonymization on the rows with the column having been suppressed in the group that satisfies k-anonymity with regard to the column (c), instead of conducting row suppression again on the rows that do not satisfy k-anonymity in its entirety. Thus, an advantage is produced to reduce the amount of suppression.

Furthermore, as the number of rows to be suppressed (a) is determined by using a random number at step S103 of FIG. 6, it is difficult to estimate the previous value of the suppressed value. For example, in the case of a conversion using a definitive algorithm, the presence of the individual may be estimated. Specifically, if the company Y has the information that the person whose "hobby" is petanque lives only in a non-government-designated city, such as the city B or the city C, and sees the table of FIG. 17, it may estimate that only the person whose "hobby" is petanque and whose "address" is the city B is included in the table. However, like the data securing device 1 that uses an algorithm that may suppress data at random although k-anonymity is possessed from the beginning, the estimation is uncertain.

Furthermore, in the data securing device 1, the number of rows to be suppressed (a) is calculated by using an expression such as ceil($\log_r u-1$) that, as a becomes larger, the acquisition percentage becomes lower; thus, the amount of suppression may be reduced. As a result, the degree of conversion of the table may be reduced.

As described above, the anonymizing unit 11 of the data securing device 1 receives the individual data 21 and a parameter for anonymization and suppresses data that does not satisfy k-anonymity by using the parameter among the data that is included in each attribute of a record in the individual data 21. Furthermore, the anonymizing unit 11 suppresses data that is extracted from data in the individual data 21 at random. The output unit 12 of the data securing device 1 outputs the individual data in which data has been suppressed by the anonymizing unit 11. Thus, the output unit 12, for which securement is made by the data securing device 1, may make it uncertain to estimate whether a specific person is not included and may secure the presence of the individual.

Furthermore, the anonymizing unit 11 performs a operation to suppress data that does not satisfy k-anonymity with regard to a certain attribute among the attributes and suppresses data that is extracted from the data at random. Then, in the operation, the anonymizing unit 11 suppresses data that does not satisfy k-anonymity further with regard to a different attribute and suppresses data that is extracted from the data at random. And, the anonymizing unit 11 performs the operation, recursively, thereby suppressing the data that is included in each attribute. Thus, the anonymizing unit 11 may reduce the amount of suppression.

Furthermore, the anonymizing unit 11 lowers the percentage of random extraction in accordance with an increase in the number of records, whereby the amount of suppression may be reduced.

Furthermore, components of each unit illustrated do not always need to be physically configured as illustrated in the drawings. Specifically, specific forms of separation and combination of each unit are not limited to those depicted in the drawings, and a configuration may be such that all or some of them are functionally or physically separated or combined in an arbitrary unit depending on various types of loads or usage. For example, each of the anonymizing unit 11, the output unit 12, or the like, in the above-described embodiment may be combined.

Furthermore, all or any part of various processing functions performed by each device may be implemented by a CPU (or a microcomputer such as an MPU or MCU (micro controller unit)). Furthermore, it is self-evident that all or any of the various processing functions may be implemented by programs that are analyzed and executed by a CPU (or a microcomputer such as an MPU or MCU) or by wired logic hardware.

Figure 14:
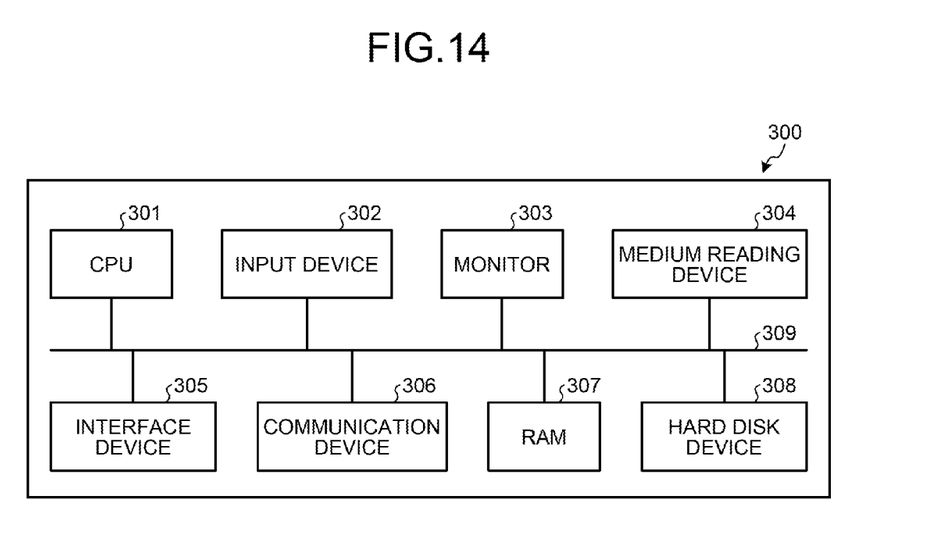
FIG. 14 is an explanatory diagram that illustrates an example of a computer that executes a data securing program.

Furthermore, the various processes that are described in the above embodiment may be performed if prepared programs are executed by a computer. Therefore, in the following, an explanation is given of an example of a computer that executes a program that has the same functionality as that in the above-described embodiment. FIG. 14 is an explanatory diagram that illustrates an example of a computer 300 that executes a data securing program.

As illustrated in FIG. 14, the computer 300 includes a CPU 301 that performs various calculation operations, an input device 302 that receives data input, and a monitor 303. Furthermore, the computer 300 includes a medium reading device 304 that reads a program, or the like, from a storage medium, an interface device 305 for connecting to various devices, and a communication device 306 for connecting to a different device wired or wirelessly. Furthermore, the computer 300 includes a RAM 307 that temporarily stores various types of information and a hard disk device 308. Moreover, each of the devices 301 to 308 are connected to a bus 309.

The hard disk device 308 stores the data securing program that has the same functionality as each processing unit that is described in the above-described embodiment. Furthermore, the hard disk device 308 stores various types of data for implementing the data securing program. The input device 302 receives inputs from, for example, a user. The monitor 303 displays an operation screen for receiving inputs from a user or displays various types of information. The interface device 305 is connected to, for example, a printing device. The communication device 306 is connected to, for example, an external device or a network.

The CPU 301 reads each program that is stored in the hard disk device 308 and loads and executes it on the RAM 307 so as to perform various operations. Furthermore, these programs may cause the computer 300 to perform the same functionality as each processing unit that is described in the above embodiment.

Furthermore, the above-described data securing program does not always need to be stored in the hard disk device 308. For example, the computer 300 may read and execute the program that is stored in a storage medium readable by the computer 300. The storage medium readable by the computer 300 corresponds to a portable recording medium, such as a CD-ROM, DVD disk, or universal serial bus (USB) memory, a semiconductor memory such as a flash memory, a hard disk drive, or the like. Furthermore, the data securing program may be stored in a device that is connected to a public network, the Internet, a LAN, or the like, and the data securing program may be read from the above and be executed by the computer 300.

According to an embodiment of the present invention, the presence of the individual may be secured.

All examples and conditional language recited herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although the embodiment of the present invention has been described in detail, it should be understood that the various changes, substitutions, and alterations could be made hereto without departing from the spirit and scope of the invention.

What is claimed is:

1. A data securing device comprising a processor that executes a process comprising:
   receiving individual data including records, a k parameter of k-anonymity and a suppression parameter that is a number of records on which data is to be suppressed;
   suppressing, according to the k parameter, data of a first attribute of a record, the data not satisfying k-anonymity with regard to the first attribute, suppressing data of the first attribute of a record that is selected at random from records that satisfy the k-anonymity with regard to the first attribute, recursively suppressing data of a second attribute of a record among the records that satisfy the k-anonymity with regard to the first attribute, the data not satisfying the k-anonymity with regard to the second attribute, and suppressing data of the second attribute of a record that is selected at random from records that satisfy the k-anonymity with regard to the second attribute;
   selecting records at random from the individual data, a number of the selected records equaling the received suppression parameter, and suppressing data on the selected records; and
   outputting individual data that includes the suppressed data.

2. The data securing device according to claim 1, wherein in the suppressing a percentage of a number of records selected at random is lowered in accordance with an increase in a number of the records.

3. A non-transitory computer-readable recording medium having stored therein an information processing program that causes a computer to execute a process comprising:

receiving individual data including records, a k parameter of k-anonymity and a suppression parameter that is a number of records on which data is to be suppressed;

suppressing, according to the k parameter, data of a first attribute of a record, the data not satisfying k-anonymity with regard to the first attribute, suppressing data of the first attribute of a record that is selected at random from records that satisfy the k-anonymity with regard to the first attribute, recursively suppressing data of a second attribute of a record among the records that satisfy the k-anonymity with regard to the first attribute, the data not satisfying the k-anonymity with regard to the second attribute, and suppressing data of the second attribute of a record that is selected at random from records that satisfy the k-anonymity with regard to the second attribute;

selecting records at random from the individual data, a number of the selected records equaling the received suppression parameter, and suppressing data on the selected records; and outputting individual data that includes the suppressed data.

4. The non-transitory computer-readable recording medium according to claim 3, wherein in the suppressing a percentage of a number of records selected at random is lowered in accordance with an increase in a number of the records.

5. A data securing method comprising:

receiving individual data including records, a k parameter of k-anonymity and a suppression parameter that is a number of records on which data is to be suppressed;

suppressing, according to the k parameter, data of a first attribute of a record, the data not satisfying k-anonymity with regard to the first attribute, suppressing data of the first attribute of a record that is selected at random from records that satisfy the k-anonymity with regard to the first attribute, recursively suppressing data of a second attribute of a record among the records that satisfy the k-anonymity with regard to the first attribute, the data not satisfying the k-anonymity with regard to the second attribute, and suppressing data of the second attribute of a record that is selected at random from records that satisfy the k-anonymity with regard to the second attribute, using a processor;

selecting records at random from the individual data, a number of the selected records equaling the received suppression parameter, and suppressing data on the selected records, using the processor; and outputting individual data that includes the suppressed data, using the processor.

6. The data securing method according to claim 5, wherein in the suppressing a percentage of a number of records selected at random is lowered in accordance with an increase in a number of the records.

* * * * *